United States Patent
Bui

(10) Patent No.: US 7,799,129 B2
(45) Date of Patent: *Sep. 21, 2010

(54) LIGHTWEIGHT STRUCTURAL CONCRETE PROVIDED WITH VARIOUS WOOD PROPERTIES

(76) Inventor: Thuan Bui, 58 N. Mascher St., Philadelphia, PA (US) 19106

( * ) Notice: Subject to any disclaimer, the term of this patent is extended or adjusted under 35 U.S.C. 154(b) by 61 days.

This patent is subject to a terminal disclaimer.

(21) Appl. No.: 12/029,734

(22) Filed: Feb. 12, 2008

(65) Prior Publication Data

US 2008/0176967 A1 Jul. 24, 2008

Related U.S. Application Data

(63) Continuation-in-part of application No. 11/607,885, filed on Dec. 4, 2006.

(60) Provisional application No. 60/741,487, filed on Dec. 2, 2005, provisional application No. 60/786,729, filed on Mar. 29, 2006, provisional application No. 60/993,061, filed on Sep. 10, 2007.

(51) Int. Cl.
C04B 16/08 (2006.01)

(52) U.S. Cl. .............. 106/724; 106/644; 106/672; 106/679; 106/705; 106/713; 106/737; 106/DIG. 1; 106/DIG. 2

(58) Field of Classification Search ............... 106/713, 106/724, 644, 672, 679, 705, 737, DIG. 1, 106/DIG. 2

See application file for complete search history.

(56) References Cited

U.S. PATENT DOCUMENTS

| | | | | |
|---|---|---|---|---|
| 3,764,357 A | * | 10/1973 | Bowles | 521/55 |
| 3,869,295 A | * | 3/1975 | Bowles et al. | 521/55 |
| 4,293,341 A | * | 10/1981 | Dudley et al. | 106/675 |
| 4,900,359 A | | 2/1990 | Gelbman | |
| 5,080,022 A | | 1/1992 | Carlson | |
| 5,183,505 A | | 2/1993 | Spinney | |
| 5,580,378 A | * | 12/1996 | Shulman | 106/677 |

(Continued)

FOREIGN PATENT DOCUMENTS

JP 8-157278 6/1996

(Continued)

OTHER PUBLICATIONS

U.S. Appl. No. 11/607,885, filed Dec. 4, 2006, Bui, Thuan.

(Continued)

*Primary Examiner*—Paul Marcantoni
(74) *Attorney, Agent, or Firm*—Hung H. Bui, Esq.

(57) ABSTRACT

A lightweight structural concrete with screw-ability and nail-ability similar to wood is composed of a non-structural and ultra lightweight aggregate such as expanded perlite or a combination of expanded perlite and polystyrene beads of a particular size distribution and volume amount, entrained air cells of another specific size distribution and volume amount, and dense cementitious composition of a cement binder, a fine grade structural filler no larger than concrete sand grade, a pozzolan, and optional micro-fibers for reinforcement. This structural concrete matrix is optimized to hold 13 gauge T-nails and bugle head wood screws with thread ranging from 8 to 11 threads per inch and diameter of 0.10" to 0.137". The resulting concrete will have consistent screw-ability and nail-ability similar to that of wood.

12 Claims, 8 Drawing Sheets

U.S. PATENT DOCUMENTS

| | | | |
|---|---|---|---|
| 5,725,652 A | 3/1998 | Shulman | |
| 5,759,260 A * | 6/1998 | Groh | 106/672 |
| 6,030,446 A * | 2/2000 | Doty et al. | 106/677 |
| 6,290,769 B1 * | 9/2001 | Carkner | 106/675 |
| 6,488,762 B1 * | 12/2002 | Shi | 106/676 |
| 6,528,547 B2 | 3/2003 | Shulman | |
| 6,875,266 B1 * | 4/2005 | Naji et al. | 106/724 |
| 6,881,257 B2 | 4/2005 | Beauboeuf | |
| 2005/0209414 A1 * | 9/2005 | Naji et al. | 525/333.3 |
| 2006/0217464 A1 * | 9/2006 | Guevara et al. | 524/2 |
| 2006/0225618 A1 * | 10/2006 | Guevara et al. | 106/677 |
| 2007/0062415 A1 * | 3/2007 | Guevara et al. | 106/638 |
| 2008/0058446 A1 * | 3/2008 | Guevara et al. | 524/2 |
| 2008/0314295 A1 * | 12/2008 | Guevara et al. | 106/668 |

FOREIGN PATENT DOCUMENTS

| | | |
|---|---|---|
| JP | 8-277153 | 10/1996 |
| JP | 9-52779 | 2/1997 |
| JP | 11-343155 | 12/1999 |
| KR | 1998-16799 | 6/1998 |
| KR | 100199041 | 3/1999 |

OTHER PUBLICATIONS

PCT Search Report issued on International Application No. PCT/US2008/010544 on May 28, 2009.

PCT Search Report issued in International Application No. PCT/US2007/025725 on Jun. 18, 2009.

* cited by examiner

LIGHTWEIGHT STRUCTURAL CONCRETE PROVIDED WITH VARIOUS WOOD PROPERTIES

CROSS-REFERENCE TO RELATED APPLICATIONS

This application is a continuation-in-part of an earlier patent application Ser. No. 11/607,885, filed on Dec. 4, 2006, now pending, which, in turn, claims the benefit of earlier provisional application No. 60/741,487 filed on Dec. 2, 2005, and provisional application No. 60/786,729 filed on Mar. 29, 2006 in the U.S. Patent & Trademark Office, the disclosure of which are incorporated by reference herein. This application also claims the benefit accruing under 35 USC §120 of an earlier provisional application No. 60/993,061, filed on Sep. 10, 2007, the disclosure of which is also incorporated herein by reference.

BACKGROUND OF THE INVENTION

1. Field of the Invention

The present invention relates to lightweight concrete with structural strength and density according to ASTM standard.

2. Description of the Related Art

American Society for Testing and Materials (ASTM) standard defines structural lightweight concrete as having a compression strength in excess of 17.2 MPa (2,500 psi) after 28 days curing when tested in accordance with ATSM C 330, and an air dry density not exceeding 1,842 kg/m3 (115 lb/ft3) as determined by ASTM C 567. Standard concrete mix is made of coarse aggregate (stone), fine aggregate (sand), and cement binder. Similarly to standard concrete mix, many current structural lightweight concrete mixtures have the same mix composition, except that the aggregates in the mix are replaced with lower-density ones. Lower-density replacement aggregates can be of man-made aggregates or natural aggregates, and have compression greater than structural strength of 2,500 psi. For example, most common man-made (synthetic) lightweight aggregates include expanded shale or clay, cinders, and expanded slag. The most common natural lightweight aggregates include pumice, scoria, tuff, and diatomite.

Currently, the use of structural lightweight concrete has been limited to large cast structures where its lower density is required, such as bridges and high rises. Like most normal concrete materials, its utilization in residential buildings has been limited due to its inflexibility, material cost, and associated labor cost in handling the material. Thus, an economical lightweight concrete with structural strength and wood-like properties would be very valuable because it could overcome the limitations of traditional concrete and lightweight structural concrete now used in building applications. However, it is necessary to understand the common types of concrete matrix of both conventional and lightweight concrete, and their mechanics before better design and improvement can be obtained given its properties.

Most lightweight concrete (structural or otherwise) falls into three (3) categories. First category of lightweight concrete relates to the standard structural concrete that utilizes lighter aggregates, such as expanded shale or expanded clay as normal stone replacement. The size of lightweight structural aggregates varies from coarse to fine. The mechanics of standard structural concrete matrix work the same way as regular concrete, since the structural aggregates are used to carry the load directly. Second category of lightweight concrete relates to the type of concrete that has no coarse aggregates with structural strength. This concrete is typically provided with fine structural fillers, such as masonry sand and air cells, expanded perlite, vermiculite, or wood particle as the larger non-structural fillers to take up space in the matrix. The concrete matrix in the second category (whether it is cellular or perlite concrete) relies solely on the solid cementitious structure (cement binder and fine structural aggregates such as sand) enveloping the air cells or the expanded perlite to carry the load. Third category of lightweight concrete relates to the type of concrete that has both structural and non-structural aggregates larger than masonry sand; the concrete matrix will have elements of both the first and second categories.

Hereon, the term "structural aggregate" is defined as aggregate that has a compression strength that is greater that 2500 psi as consistent with the term "structural" referred in ASTM standard for concrete. The term "non-structural aggregate" is defined as aggregate with compression strength of 2500 psi or less.

In the second category of lightweight concrete, most are cellular concrete, perlite concrete, vermiculite concrete or the like. These types of lightweight concretes are often provided with non-structural strength and are limited in construction applications. Examples of such cellular concrete are disclosed in U.S. Pat. No. 4,900,359 entitled "Cellular concrete"; U.S. Pat. No. 5,183,505 entitled "Cellular concrete"; and U.S. Pat. No. 6,488,762 entitled "Composition of materials for use in cellular lightweight concrete and methods thereof". Examples of such perlite concrete include U.S. Pat. No. 5,080,022 entitled "Composite material and method", and U.S. Pat. No. 6,881,257 entitled "Machinable light weight sisal-based concrete structural building material". A few of the non-structural lightweight concretes can display some very low level of screw-ability and nail-ability, but nothing close to the properties of wood. As a result, the holding strength of screws and grip strength of nails are very poor in comparison to wood. Normally, these types of lightweight concretes tend to crack when screwed or nailed by a user. A few structural lightweight concretes, such as those disclosed in U.S. Pat. No. 5,080,022 and U.S. Pat. No. 6,488,762, may have the desired structural strength but they lack the screw-ability and nail-ability of wood. Moreover, these types of lightweight concretes are not very economical on a large manufacturing scale, because the mixture requires a large amount of expensive cement binder, or has very limited supply of components as in the case of ground recycled glass.

Cellular and non-structural aggregate, such as expanded vermiculite or perlite concrete, has been limited only to a few applications that do not require structural strength, but rather take advantage of the insulating characteristics. Past attempts to make this type of concrete into structural grade and make it more economical have resulted in failure. Such past failures are generally attributable to the lack of understanding of the concrete's matrix and its complex mechanism at the micro-structure level. It is well known that a solid ordinary concrete made of fly ash, Portland cement and sand, can have compression strength of 8,000-9,000 psi. This strength is much more than the structural requirement of most applications. Therefore, it would make sense to lighten it by introducing effective voids in the concrete. However, creating void cells in the concrete matrix has not been so easy for the last few decades. Moreover, obtaining desirable properties in cellular concrete or non-structural aggregate concrete with the least amount of material and labor cost can also be a science, given that exotic materials with limited supply required for any concrete mixes or certain complex manufacturing processes will always make the concrete expensive. Therefore, in order to be cost effective, the concrete has to be made using common materials that are abundant in supply; and its manufacture process must also be simple.

Presently, cellular or non-structural aggregate concretes of second category have only one effective void size distribution. Applicant has discovered that the concrete matrix of this type could be improved by having two void size distributions instead of one. Given the same total effective void volume, the concrete with two void size distributions will always be more stable and have higher strength than the concrete with one void size distribution. The wider spacing between the effective void cells can accommodate more reinforcing fibers. Applicant has also discovered that by using a combination of water-absorbent and non-absorbent expanded aggregates, the water to cement ratio of the concrete mix can be lowered, when the water-absorbent (dry) is mixed just before pouring. The ratio of water-absorbent and non-absorbent aggregates can be adjusted to absorb the desired amount of water out of the concrete mix before setting.

SUMMARY OF THE INVENTION

Several aspects and example embodiments of the present invention provide a unique lightweight concrete that has structural property and screw-ability and nail-ability properties similar.

In accordance with an example embodiment of the present invention, there is provided a high strength lightweight concrete that can be screwed and nailed using traditional joining tools, comprising: a non-structural lightweight aggregate such as expanded perlite or expanded polystyrene beads, or a combination of expanded perlite and expanded polystyrene bead with average particle size of between 1 mm to 2.5 mm with the narrowest possible size difference between the largest and smallest particles, occupying between 8% to 25% of total concrete volume; another smaller non-structural aggregate like the former or entrained air cells created by an admixture or combination of both with average cell (or effective void) size no larger than 70% of the non-structural filler's average particle size with minimum cell size variance occupying between 5% and 20% of the total concrete volume; and a dense cementitious composition comprising of cement binder, pozzolan, optional short fibrillated fiber like PVA, and fine structural filler occupying the remainder 55% to 87% of total concrete volume. Fine structural filler can be fine masonry sand or fine concrete sand with at least 75% of sand contents meeting ASTM C144 or ASTM C33 specification. The purpose is to create two effective void size distributions in the concrete matrix with each distribution having specific volume of total concrete volume. The purpose for having a combination of expanded perlite (a water-absorbent material) and expanded polystyrene bead (a non water-absorbent material) is to provide the ability to control the water to cement ratio in the mix before the concrete sets. When the combination is mixed just before pouring, the ratio of the expanded perlite to expanded polystyrene bead can be adjusted according to how much water one wants to slowly absorb out of the mix before setting. Thus, a very low effective water to cement (w/c) ratio can now be achieved.

In accordance with another economical embodiment of the present invention, there is provided a high strength lightweight concrete mix comprising: (a) 1.05 to 1.75 part volume of Portland cement or modified Portland cement such as type K, M, or S; (b) 0.40 to 1.25 part volume of fly ash class F or C; (c) 1.15 to 1.85 part volume of masonry sand or a fine structural filler of size no larger than masonry sand; (d) 0.75 to 1.85 part volume of expanded perlite or of expanded polystyrene bead or of a combination of expanded perlite and expanded polystyrene bead with a distribution mean size between 1 mm to 2.5 mm and with at least 75% of the amount of particles falling within +/−0.6 mm from center of the mean size; (e) 0.65 to 1.20 part volume of water or a water to cement (W/C) ratio in the range of 0.4 to 0.67; (f) a predetermined amount of a high-range super-plasticizer to reach a desirable slump, workability, or self-consolidating level; and (g) a predetermined amount of air entrainment admixture to produce 5% to 20% entrained air with a cell size distribution mean no larger than 70% of size distribution mean of expanded perlite in the concrete.

According to an aspect of the present invention, short fibrillated PVA fiber or other micro-fiber of similar properties is further provided to reinforce the concrete so as to reduce crack propagation and to provide structural reinforcement in applications where steel mesh is not used. The preferred fiber length is 6 mm to 15 mm. Amount of fiber can be in the range 0.2% to 3% of total concrete volume.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

The present invention relates to a unique lightweight concrete that has structural, screw-ability and nail-ability properties similar to that of wood. For purposes of discussion, the structural property relates to the compression strength of greater than 2,500 psi. Lightweight refers to a density that is less than 115 lb/ft$^3$. Various wood properties relate to the ability of the lightweight concrete to be easily cut by a saw, screwed by common wood screws and nailed by certain hardened nails without cracking. The combinations of these properties make it unique and valuable in many building construction applications.

Reference will now be made in detail to the types of lightweight concretes, the types of concrete matrix and its mechanics, and facts that provide unique properties to the applicant's concrete matrix. The present embodiment of the present invention, examples of which are illustrated in the accompanying drawings, is referred to throughout. The embodiments are described below in order to explain the present invention by referring to the figures.

Figure 1:
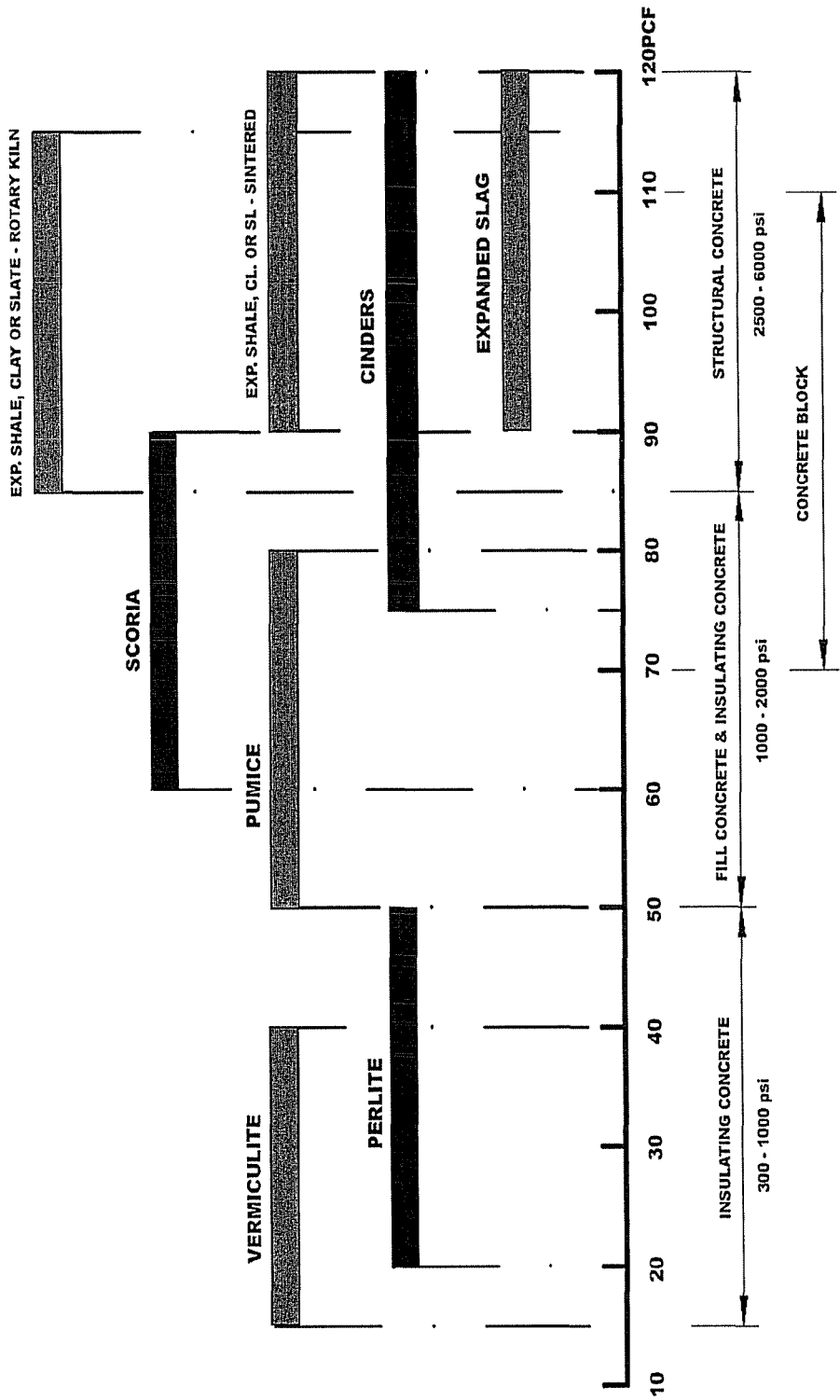
FIG. 1 illustrates currently available lightweight concrete mixes.

FIG. 1 illustrates various available lightweight aggregate concrete mixes ranging from non-structural to structural strength, with the structural mixes containing structural lightweight aggregate, such as expanded shale, expanded slag, cinders, or expanded clay. As previously discussed, conventional structural lightweight concrete mixes, as shown in FIG. 1, do not have screw-ability and nail-ability properties similar to that of wood.

Figure 2:
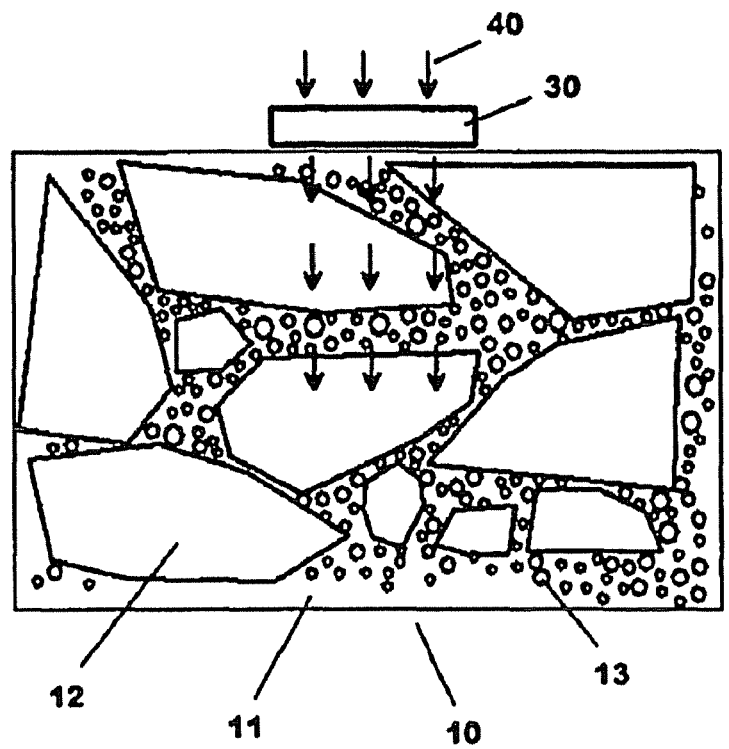
FIG. 2 illustrates the matrix of a standard concrete and its mechanics.

FIG. 2 illustrates a typical matrix of a standard concrete and its mechanics 10. The intention of this figure is to show how the concrete works to carry its load so as to better understand this aspect of concrete. As shown in FIG. 2, the standard concrete has coarse stone aggregates 12, fine sand aggregates 13, and a composition of cement binder and fly-ash 11. The mechanics of this matrix is straightforward. Force vectors 40 from a load starting from above a plate 30 travel a straight downward path through the structural aggregates 12 and through all materials in their path. This is because all the aggregates in this matrix have structural strength and are capable of holding up the load. The coarse stone aggregates 12 play an important role in providing the concrete strength.

Figure 3:
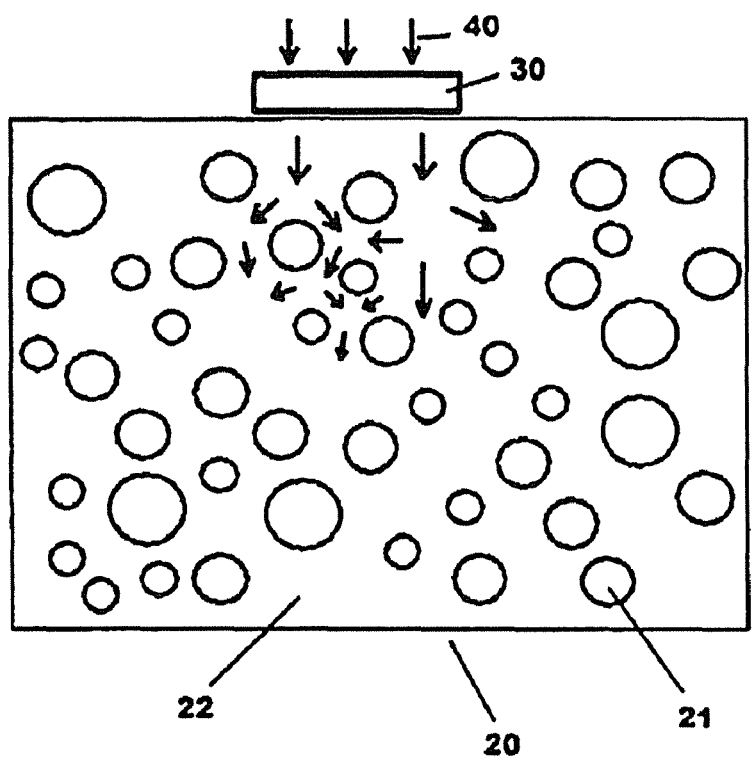
FIG. 3 illustrates the matrix of a cellular concrete and its mechanics.

FIG. 3 illustrates a matrix of a cellular or non-structural filler concrete 20 and its mechanics. This type of concrete matrix works differently from standard concrete. As shown in FIG. 3, the cellular or non-structural filler concrete 20 is provided with non-structural fillers or voids 21 and a solid or cementitious structure 22. However, the mechanics of this matrix is more complex. Force vectors 40 from a load are distributed and dispersed in different directions within the cementitious structure 22 and travel around the non-structural fillers or voids 21. The vectors 40 interact with one another to hold up the load. In this matrix, the cementitious structural composition 22 does all the work and is often made of a cement binder, such as Portland cement, pozzolan such as fly-ash, and fine structural filler such as sand. As Applicant has discovered, the design of this solid structure 22 enveloping the non-structural fillers or voids is very important in providing compression strength, screw-ability, and nail-ability of an economic concrete of this type.

Figure 4:
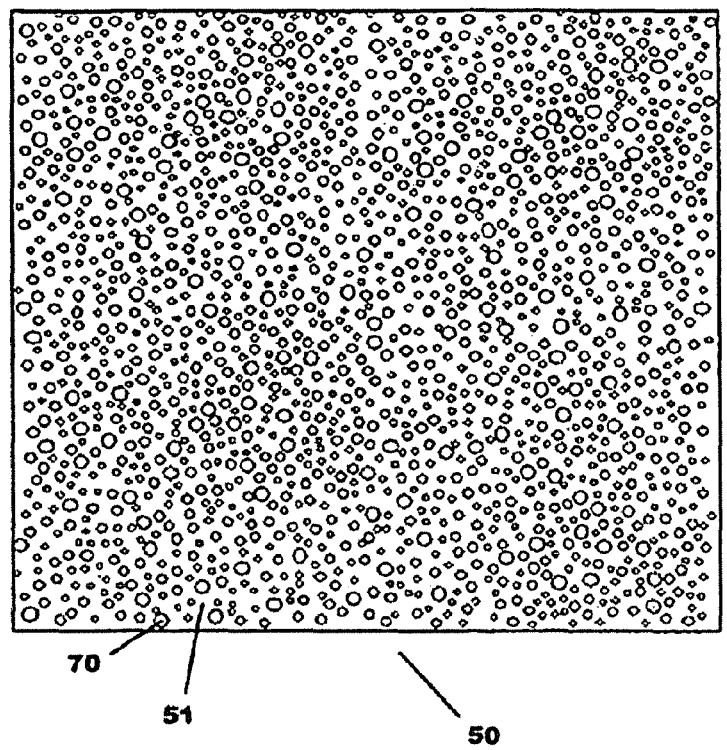
FIG. 4 illustrates the matrix of a typical cellular concrete.
Figure 5:
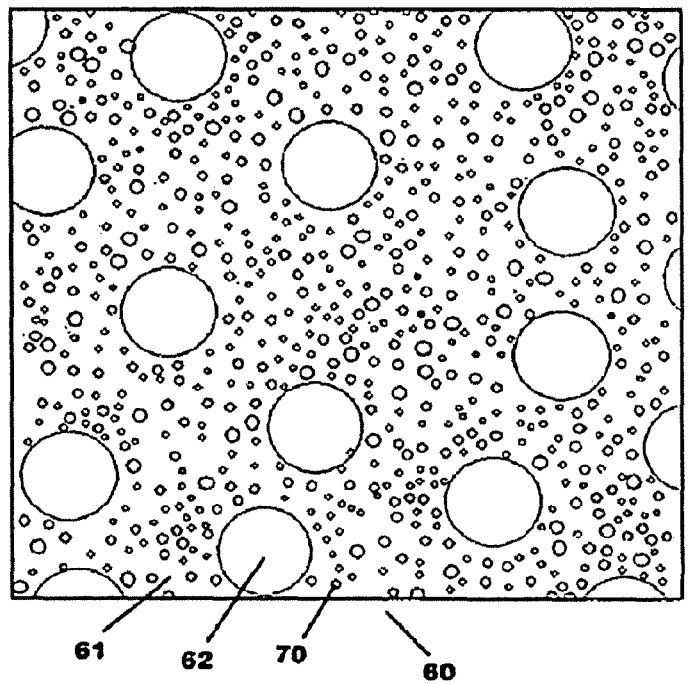
FIG. 5 illustrates an example matrix of Applicant's high strength lightweight concrete with the same density and total void volume as in the cellular concrete shown in FIG. 4.

FIG. 4 and FIG. 5 show the difference between Applicant's concrete matrix and ordinary cellular concrete matrix. FIG. 4 illustrates a typical cellular concrete matrix 50 with 30% total void volume. As shown in FIG. 4, the cellular concrete 50 is also provided with entrained air cells or voids 70 and a solid or cementitious structure 51. However, the air cells or effective voids 70 in the concrete 50 are of a single size distribution. The cementitious composition 51 is composed of Portland cement and fly-ash. In this typical cellular matrix, the space between the cells or voids 70 is very narrow.

Turning now to FIG. 5, an ideal concrete matrix 60 with the same 30% effective total void volume equivalent to the cellular matrix shown in FIG. 4 according to an example embodiment of the present invention is illustrated. The unique aspect of the matrix according to an example embodiment of the present invention is that it has two different effective void size distributions: the larger effective void distribution created by non-structural filler 62 can be expanded perlite or polystyrene beads or a combinations of expanded perlite and expanded polystyrene bead, and the smaller effective void distribution can be created by an entrained air cell 70 or another non-structural filler. Both the larger effective voids 62 and smaller effective voids 70 each have their own size distribution and amount dispersed throughout the matrix 60. The structural and cementitious composition 61 that envelopes both effective voids 70 and 62 is composed of a cement binder, pozzolan, and fine structural filler size no larger than masonry sand. The most important point to notice between this matrix and the typical cellular matrix of equal density is that Applicant's matrix produces a wider cementitious structure between the voids in the concrete matrix 60 and few force vectors. The direction of force vectors within the concrete will also be different with two void size distributions and is suspected to be more parallel to the force vectors exerted by an exterior load.

Figure 6:
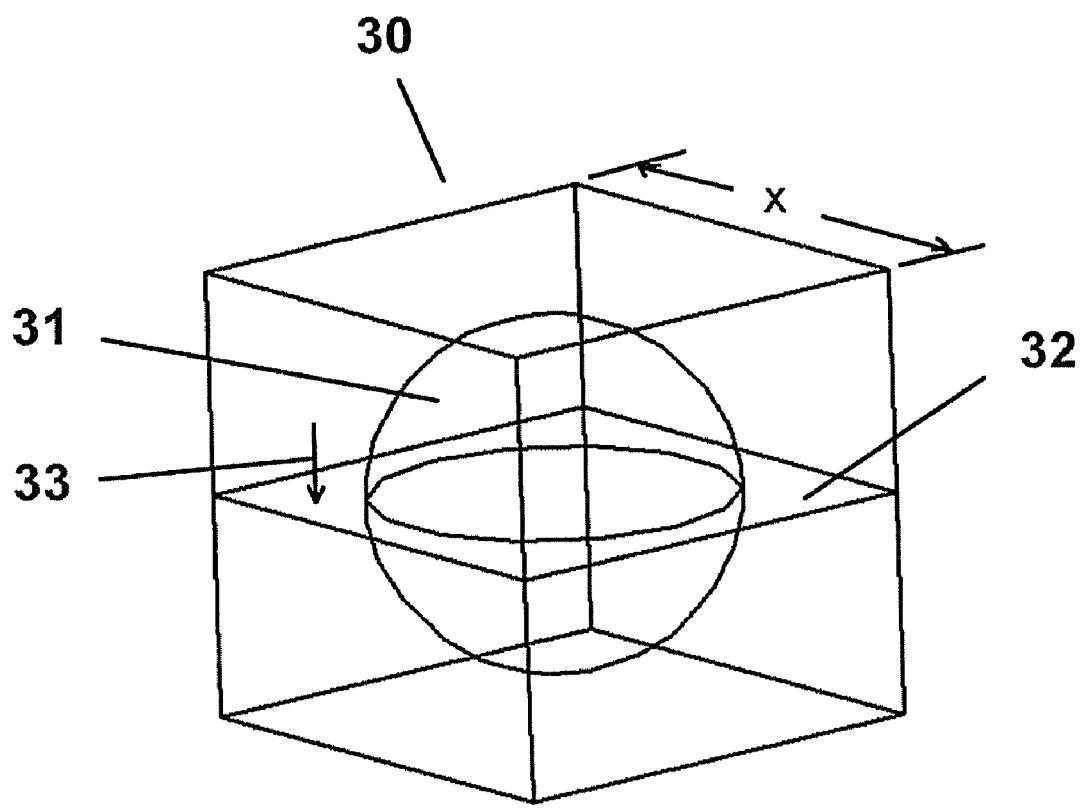
FIG. 6 illustrates a cube of concrete with sphere void in the center.
Figure 7A:
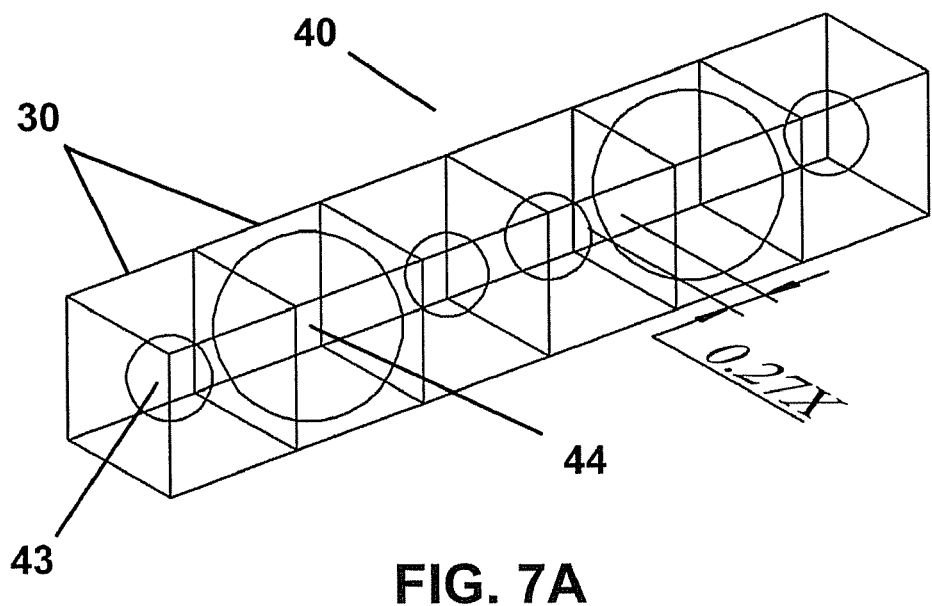
FIG. 7A illustrates many concrete cubes of X dimension assembled into one row, but the voids now are of two sizes and of the same total void volume.
Figure 7B:
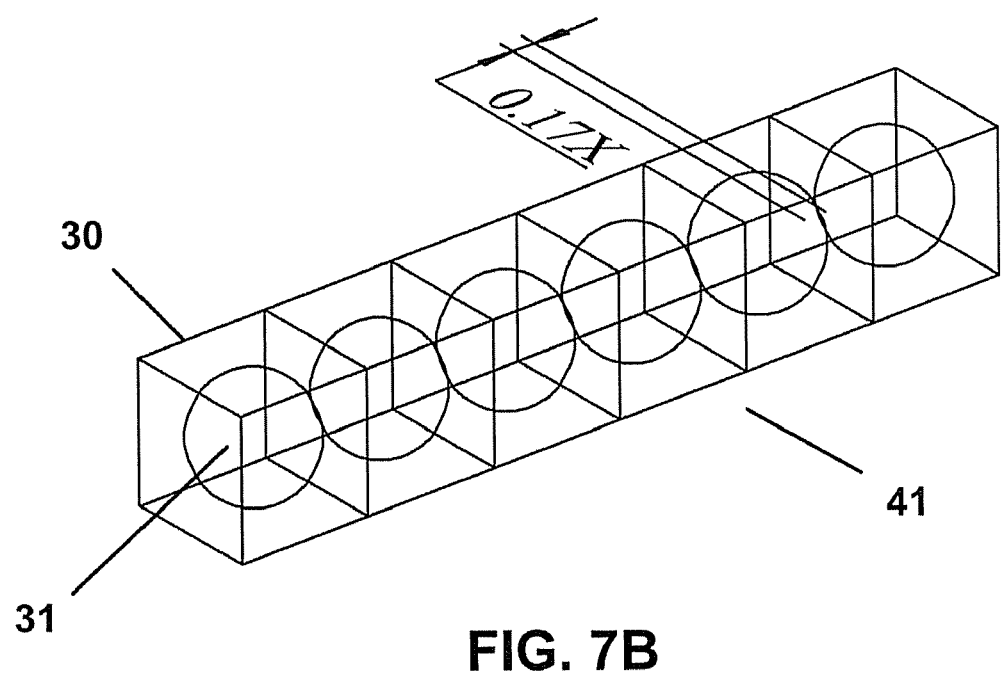
FIG. 7B illustrates many concrete cubes 30 assembled into one row and the spacing between the void cells.
Figure 8A:
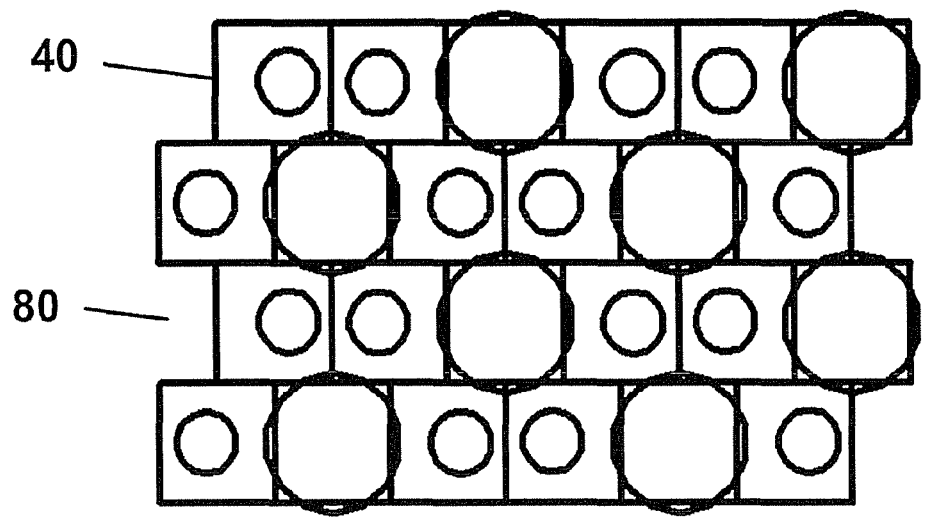
FIG. 8A illustrates Applicant's theoretical concrete matrix 80 made of multiple rows of concrete blocks 40.
Figure 8B:
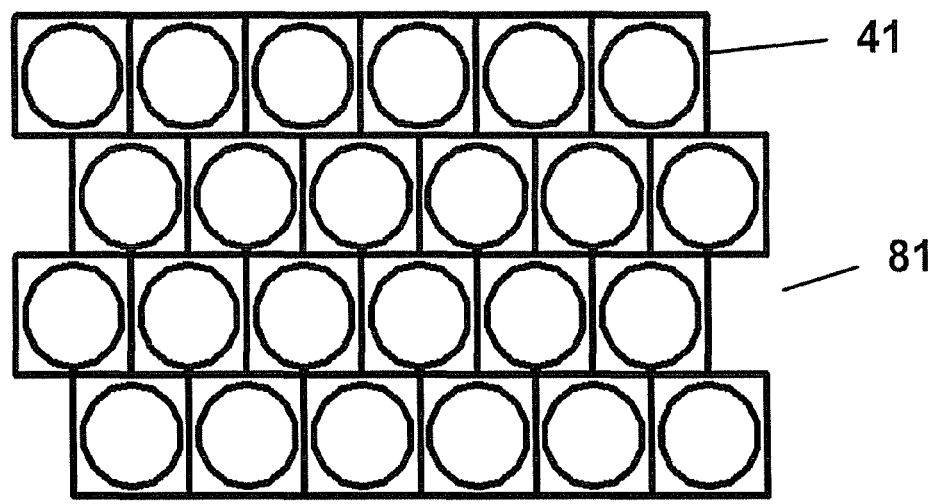
FIG. 8B illustrates a typical cellular concrete matrix 81 made of multiple rows of concrete blocks 41.
Figure 9A:
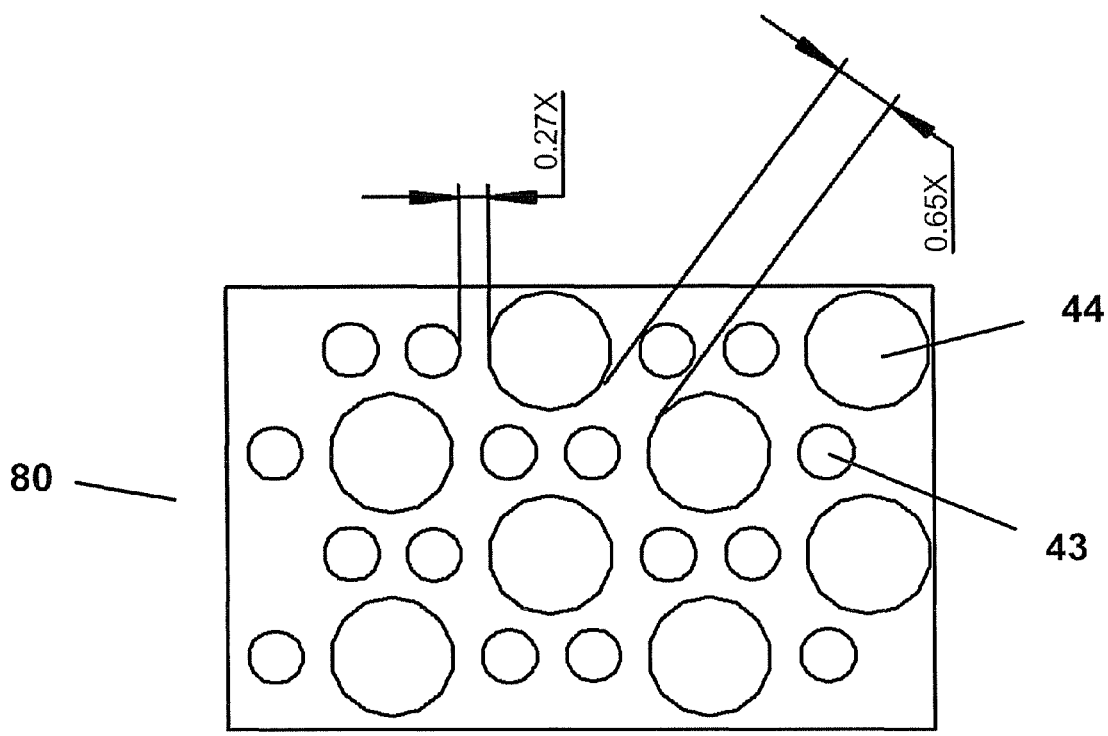
FIG. 9A illustrates the concrete matrix shown in FIG. 8A without lines of concrete cubes so to resemble a real matrix.
Figure 9B:
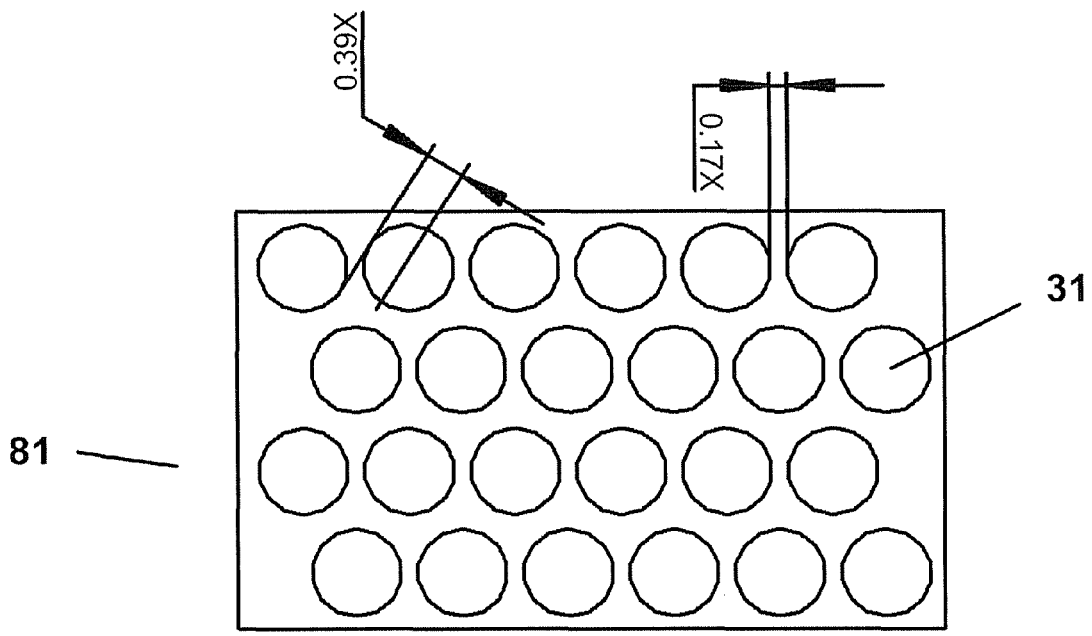
FIG. 9B illustrates the concrete matrix shown in FIG. 8B without lines of concrete cubes so to resemble a real matrix.
Figure 10:
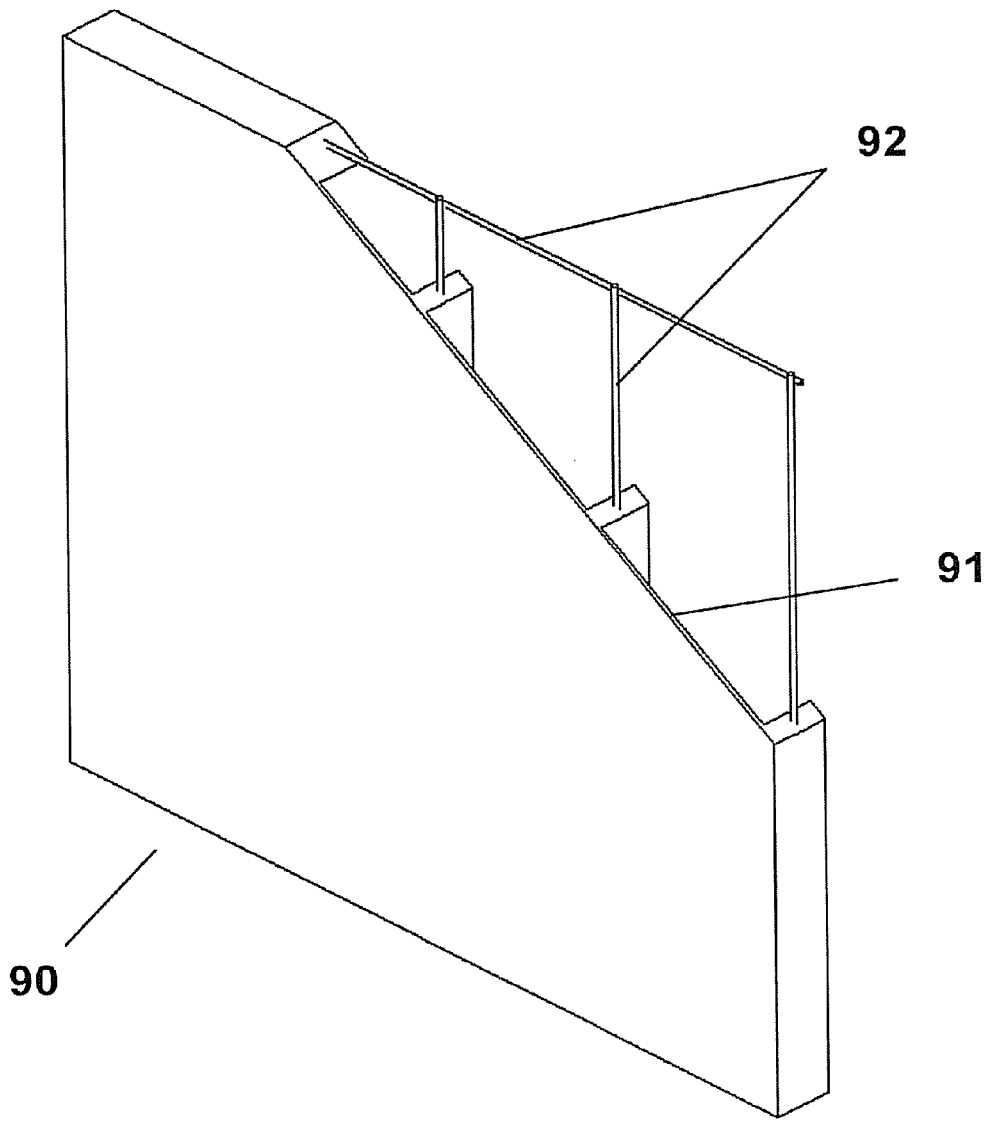
FIG. 10 illustrates an example residential wall panel that can be cast with Applicant's concrete.

The spacing effect when there are two void size distributions instead of one is an important aspect of Applicant's concrete matrix. This spacing effect can be explained in connection with FIG. 6 through FIG. 9. Specifically, FIG. 6 illustrates a cube of concrete with sphere void in the center. FIG. 7A illustrates multiple concrete cubes of X dimension assembled into one row, but the voids now are of two sizes and of the same total void volume. Similarly, FIG. 7B illustrates multiple concrete cubes 30 assembled into one row and the spacing between the void cells. FIG. 8A illustrates Applicant's theoretical concrete matrix 80 made of multiple rows of concrete blocks 40, whereas FIG. 8B illustrates a typical cellular concrete matrix 81 made of multiple rows of concrete blocks 41. FIG. 9A illustrates the concrete matrix shown in FIG. 8A without lines of concrete cubes so to resemble a real matrix, whereas FIG. 9B illustrates the concrete matrix shown in FIG. 8B without lines of concrete cubes so to resemble a real matrix; and FIG. 10 illustrates an example residential wall panel that can be cast with Applicant's concrete matrix.

Let's start with a tiny concrete cube 30 shown in FIG. 6, and assume that this concrete cube has (X) dimension and has an air sphere 31 in the center of the cube occupying ⅓ of total concrete volume. Although the concrete is ⅓ lighter, the cross-section area 32 of the cube will be reduced by 58%. The cross-section area loss is much higher than the ⅓ volume loss and is not proportional. The cross-section area 32 is very vital for the strength of the concrete because the force vector travels through it and fine aggregate must fit in it. When one assembles the same concrete cubes in a row, it would look like block 41 shown in FIG. 7B. Also, if one skilled in the art were to assemble other same (X) size cubes with larger and smaller void spheres of equal total volume it would look like block 40 in FIG. 7A. Void sphere 31 is ⅓ of the total cube volume; void sphere 43 is 0.075 of the total cube volume; and void sphere 44 is 0.85 of the total cube volume. The total volume of all spheres 43 and 44 is equal to the total of all void spheres 31. Using the sphere volume formula ($V=\frac{4}{3}\pi r^3$), the diameter of all spheres can be determined. Now, if one were to measure the spacing between the spheres, the spacing in block 40 will be much wider at approximately 0.27(X). Similarly, the spacing in block 41 will be at approximately 0.17(X). As one can see from FIG. 7A and FIG. 7B, the gain in void spacing is approximately 0.10X. The exponential relationship between r and V in $V=\frac{4}{3}\pi r^3$ plays a very important role in this effect.

Multiple blocks 40 and blocks 41 then can be assembled into planes 80 and 81 as shown in FIG. 8A and FIG. 8B to resemble Applicant's concrete matrix and a cellular concrete matrix. FIG. 9A and FIG. 9B shows the same assembly but without the cube's dimensional lines. If one were to stack multiple planes 80 and 81 into a cube, the spacing between void spheres would still remain the same in three dimensions.

Even though both the cellular matrix 50, as shown in FIG. 4, and Applicant's concrete matrix 60, as shown in FIG. 5, have the same total effective void volume in their matrices and same density, Applicant has discovered that his matrix 60 with two specific effective void distributions of different size, as shown in FIG. 5, is more stable, stronger, more water impermeable, and can accommodate more micro fiber than the regular cellular matrix 50 with single void distribution of one size, as shown in FIG. 4. The reason is due to the wider and fewer cementitious structures between all voids of large and small. This can be easily understood if one were to look at the force vectors 40 and the cementitious structure in which the force vector 40 travel through in the cellular matrix 20 as shown in FIG. 3. The wider the cementitious structure is and the fewer force vectors there are, the more stable the matrix structure will have. The wider area between all effective voids also allows more common fine structural fillers like masonry sand particles to fit in as fillers without affecting the integrity of the cementitious structure, and less cement is required. More amounts of short fibrillated micro fibers can also fit more easily in the wider cementitious structure to increase its tensile strength without affecting concrete slump. The wider and denser the cementitious structure separating the effective voids is, the less water permeable the concrete is. As discovered by Applicant, his concrete matrix of the same density as a cellular matrix having a certain amount of larger effective voids created by the non-structural aggregate 62 in the matrix 60 and certain amount of smaller effective voids created by another non-structural filler or air entrained cells 70, as shown in FIG. 5, will cause this widening effect between all effective voids. Applicant has also discovered that a certain amount of larger effective voids present in the matrix 60, as shown in FIG. 5, would greatly diminish crack propagation when a wood screw or nail penetrates. The larger effective voids around the point of fastener's penetration can act as storage space for the displaced crushed material and can reduce the propagating pressure. Through numerous testing, Applicant's concrete performs like wood, for example, if one were to use regular bugle head wood screws with thread range from 8 to 11 threads per inch and diameter of 0.10" to 0.137", and 13G T-nails.

Applicant's ideal concrete matrix, as shown, for example, in FIG. 5, has two non-structural aggregate distributions of two different sizes. The larger aggregate is non-structural filler, such as expanded perlite, expanded polystyrene bead or a combination of both; the smaller non-structural aggregate is the entrained air cells or another non-structural filler or a combination of both. The combination expanded perlite (an absorbent material) and expanded polystyrene bead (a non-absorbent material) is preferred because the water to cement ratio (w/c) can be very low. Because the expanded perlite aggregate is an absorbent material, one can adjust its ratio with respect to polystyrene beads to absorb the right amount of water out of the mix before the concrete sets. The purpose of these two size aggregates of two size distributions is to create effective voids of two different sizes distributed evenly throughout the concrete matrix, as shown in FIG. 5, to lighten it, enhance its strength/weight ratio, and make it screw-able and nail-able. The larger non-structural filler must have a mean size in the range of 1 to 2.5 mm, with the smallest variance possible. The smaller entrained air cells or effective voids must have a mean distribution size no larger than 70% of the non-structural filler mean distribution size.

In an ideal scenario, the size distribution of the non-structural aggregate and air cells should have a zero variance. However, in real life production of expanded perlite or any expanded filler a variance in size always occurs. As a result, at least 75% of the expanded perlite amount in the concrete should be within the range of +/−0.6 mm from the center of the mean size. If the size variance of the non-structural filler is too large, then the concrete matrix will not be consistent or true as defined throughout all sections within the concrete. Similarly, the entrained air cell size distribution must have a mean in the range of microscopic to 0.6 mm with the smallest variance possible. The total volume of larger effective voids created by the amount of non-structural filler, such as expanded perlite or polystyrene beads or a combination of both in the concrete must be in the range of 8% to 25% of total concrete volume. The total volume of smaller effective voids created by entrained air cells or another non-structural filler must be in the range of 5% to 20% of total concrete volume. The solid and supporting structure enveloping both the non-structural aggregates and air cells is composed of any cementitious binder, a pozzolan, optional micro fiber, and fine structural fillers with grade size no larger than masonry sand size as specified in ASTM C144.

As an example application of Applicant's matrix, as shown in FIG. 5, Applicant has also formulated an ideal mix of this matrix using common components that are readily available to make it economical. According to an example embodiment of the present invention, the concrete mixture is composed of:

(1) 1.05 to 1.75 part volume of Portland cement I or III or modified Portland cement such as type K, M, or S;
(2) 0.40 to 1.25 part volume of fly ash class F, or C;
(3) 1.15 to 1.85 part volume of masonry sand or other similar sized fine aggregates;
(4) 0.75 to 1.85 part volume of expanded aggregate like expanded perlite or expanded polystyrene beads or combination of expanded perlite and expanded polystyrene bead with the distribution mean size between 1 mm to 2.5 mm with at least 75% of the amount of particles falling within the range of +/−0.6 mm from center of the mean size;
(5) 0.65 to 1.20 part volume of water or maintaining (Water/Cement) weight ratio in the range of 0.37 to 0.6;
(6) Optional short fibrillated PVA fiber or other micro-fiber for reinforcement its matrix as required for crack control and structural reinforcement in applications where steel mesh is not used, amount of which occupied 0.25 to 3% of concrete volume;
(7) Amount of an air entrainment admixture to produce 5% to 20% entrained air in concrete with average cell size less than 70% of average expanded aggregate size;
(8) Amount of high-range super-plasticizer admixture to achieve a desired slump; and
(9) Optional waterproofing admixture, such as, Euclid Chemical Company's BlockTite and Penetron International's Penetron Admix to further increase the concrete's water impermeability.

Samples based on this ideal concrete mix were prepared and successfully tested. The concrete mix used for all samples contains 1.40 part volume of Portland cement type K, 1.00 part volume of fly ash class F, 1.60 part volume of masonry sand, 1.00 to 1.34 part volume of 50% expanded perlite and 50% expanded polystyrene bead with 75% of particles falling in between 1.2 mm and 1.8 mm, 0.91 part volume of water, 0.0135 part volume of Sikament 6100 (a high range superplasticizer admixture), 0.00342 to 0.00548 part volume of Sika Air (an air entrainment admixture) depending on the desired total air volume in the concrete to achieve certain density, and 1.2% concrete volume of fibrillated PVA size 8 mm and 12 mm made by Kuraray America. The mixing process used for this concrete is the same as the industry's transit mix procedure for perlite concrete. In this mixing procedure, the dry expanded perlite is slowly added after the cementitious mix becomes slurry. Because the dry expanded perlite will slowly absorb water out of the slur, the mix will often lose its slump before it sets. The effective water/cement ratio of the mix will be lower at the set time. Strength and density results of the samples are shown in the following Table #1.

TABLE #1

| Density ($lbs/ft^3$) | Est. total perlite Vol. | Est. total air Vol. | Total effective void Vol. | Compressive strength in 28 days (psi) | Compressive strength in 30 days (MPa) |
|---|---|---|---|---|---|
| 88 | 22.0% | 15.0% | 37.0% | 3,000 | 20.684 |
| 94 | 18.0% | 15.0% | 33.0% | 3,800 | 26.200 |
| 101 | 15.0% | 13% | 28% | 5,000 | 34.473 |
| 109 | 15.0% | 8.0% | 23.0% | 6,000 | 41.368 |

The samples with density 94 $lbs/ft^3$ were tested for screw-ability with #6 bugle head wood screws and for nail-ability with 13G T-nails. In the screw test, screwing into the concrete can be as easy as screwing into wood without a need for pilot hole. No cracks developed in either the screwing or nailing. The holding strength of both screw and nail is actually greater than that of wood. Both screws and nails were tested at 5/8" depth penetration. The maximum holding strength was measured with a pulling device applied to the fasteners. Samples of concrete and a pinewood of 1" thick were tested and compared. The results these pull tests are shown in the following Table #2.

TABLE #2

| Medium | Maximum Holding Force of 13G T-nail at 3/4" penetration | Maximum Holding Force of wood screw at 5/8" penetration |
|---|---|---|
| Pine | 252 lbs | 96 lbs |
| Lightweight Structural Concrete (88 $lb/ft^3$) | 378 lbs | 610 lbs |
| Lightweight Structural Concrete (94 $lb/ft^3$) | 392 lbs | 610 lbs |
| Lightweight Structural Concrete (101 $lb/ft^3$) | 400 lbs | 645 lbs |

In the samples made with a 50/50 combination of expanded perlite and expanded polystyrene bead as non-structural aggregate, the mix has better flowability and self-consolidating with less water required. Because the perlite is water absorbent and polystyrene bead is not, the ratio of the aggregate can vary depending on how much water is to absorb out of the mixture while the concrete is curing. This is a valuable technique to better control the effective water/cement ratio of the mix.

As previously described, Applicant's novel approach in concrete design is not the conventional replacement of normal-density with low-density structural aggregates, such as expanded shale or the like. Rather, the new concrete design relies on Applicant's discovery and understanding of a new type of concrete matrix: a matrix that has two different but related effective void size distributions and the ability to lower the water to cement ratio in the mix. The relationship of these two distributions in size is extremely important to its properties. The larger non-structural aggregate is non-structural fillers, such as expanded perlite or polystyrene beads or a combination of expanded perlite and expanded polystyrene beads; the smaller non-structural aggregate is entrained air cells or another non-structural filler or a combination of both. The purpose of these two size aggregates with two distinct but related size distributions is to create effective voids of two different sizes distributed evenly throughout the concrete matrix in the concrete matrix, to lighten it, enhance its strength/weight ratio, and make it screw-able and nail-able. The larger non-structural filler should have a mean size in the range of 1 to 2.5 mm, with the smallest variance of particle size possible. The smaller non-structural aggregate should have a mean size no larger than 70% of the larger non-structural filler mean size, with similarly small variance in particle size.

As a result, the present invention advantageously provides a unique lightweight concrete that has structural property and screw-ability and nail-ability properties similar to that of wood. Such a concrete structural building material of the present invention can be made into various shapes and structures for construction purposes, which include, but are not limited to, solid block, pre-shaped hollow building block, interior and exterior wall system, precast form for beam, lintel, window sill, column, precast slab, utility boxes, pipes, artistic and architectural form, drop ceiling panels, acoustic panels, roofing tiles, boards, frames, and other suitable interior and exterior construction components. Additionally, the material of the present invention can also be used for piping for marine usage, aeronautical usage and automotive usage.

To demonstrate the value of his new lightweight structural concrete, the applicant submits an example of a drawing of an actual prototype residential wall panel using his lightweight concrete. As shown in FIG. 10, this wall panel is a load-bearing wall and can have the least amount of materials (concrete and steel) in its class. Notice that panel 90 has only rebar 92 in its ribs and header for structural reinforcement. The facing 91 is only 5/8" thick without any steel mesh reinforcement and the labor associated with it. Because the panel's facing 91 is 5/8" thick and has lower density, the panel is very light by industry standard and uses a lot less concrete than other existing concrete wall panels. Using less cement and steel in wall application is not only economical, but more environmentally friendly too. As we know, less cement and steel usage would reduce both required energy and carbon dioxide emission. This panel is made possible only because of the new properties of the applicant's concrete.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A high strength lightweight concrete having a compression strength greater than 2500 psi, comprising:
   (a) 1.05 to 1.75 parts by volume of Portland cement or shrinkage-compensating cement;
   (b) 0.40 to 1.25 parts by volume of pozzolan;
   (c) 1.15 to 1.85 parts by volume of fine sand with a particle size distribution meeting at least an ASTM C33 specification;
   (d) an amount of expanded lightweight aggregate with a compression strength less than 2500 psi effective to achieve between 6% to 18% volume of the total concrete volume, and a distribution mean size between 1 mm to 2.5 mm and with at least 75% of the amount of particles falling within +/−0.6 mm from a center of the distribution mean size;
   (e) 0.65 to 1.20 parts by volume of water effective to achieve a water to cement (W/C) ratio in the range of 0.27 to 0.60;
   (f) an amount of super-plasticizer effective to produce a target slump;
   (g) an amount of air entrainment admixture effective to produce 5% to 20% entrained air with a size distribution mean no larger than 70% of the distribution mean size of the expanded lightweight aggregate in the concrete; and
   (h) an amount of synthetic fiber effective to occupy up to 3.00% volume of the total concrete volume with a minimum tensile strength of 49,000 psi and a length between 5 mm to 18 mm.

2. The high strength lightweight concrete according to claim 1, wherein the synthetic fiber is a polyvinyl alcohol or a micro-fiber used to reinforce the concrete so as to prevent crack propagation and to provide structural reinforcement in applications where a steel mesh is not used, in an amount occupying 0.20 to 3% volume of the total concrete volume.

3. The high strength lightweight concrete according to claim 1, further comprising a waterproof admixture effective to reduce both the vapor and water permeability of the concrete.

4. The high strength lightweight concrete according to claim 1, wherein the expanded lightweight aggregate is a combination of expanded perlite and expanded polystyrene bead where the ratio of the expanded perlite to the expanded polystyrene bead can be varied to absorb water out of the wet concrete mix, before the concrete set.

5. The high strength lightweight concrete according to claim 1, wherein entrained air cells in the concrete can be substituted by any expanded lightweight aggregate having a compression strength less than 2500 psi.

6. The high strength lightweight concrete according to claim 1, wherein the expanded lightweight aggregate is one of expanded polystyrene bead or a combination of expanded polystyrene and expanded perlite.

7. The high strength lightweight concrete according to claim 1, wherein the pozzolan is one of Class F fly ash, Class C fly ash, silica fume and furnace slag.

8. A lightweight concrete having a compression strength greater than 2500 psi comprising:
   (a) 1.05 to 1.75 parts by volume of one of Portland cement, magnesium based cement and a combination of Portland cement and magnesium based cement;
   (b) 0.00 to 1.25 parts by volume of one of Class F fly ash, Class C fly ash, silica fume and furnace slag;
   (c) 1.15 to 1.85 parts by volume of fine sand with a particle size distribution meeting at least an ASTM C33 specification;
   (d) an amount of expanded lightweight aggregate having a compression strength less than 2500 psi effective to achieve between 6% to 18% volume of the total concrete volume, a distribution mean size between 1 mm and 2.5 mm with at least 75% of particles falling within 0.60 mm from a center of the distribution mean size;
   (e) 0.65 to 1.20 parts by volume of water effective to achieve a water to cement (W/C) ratio in the range of 0.27 to 0.60;
   (f) an amount of super-plasticizer effective to produce a target slump;
   (g) an amount of entrainment admixture effective to produce 5% to 20% entrained air with a size distribution mean no larger than 70% of the distribution mean size of the expanded lightweight aggregate in the concrete; and
   (h) an amount of synthetic fiber effective to occupy up to 3.00% volume of the total concrete volume with a minimum tensile strength of 49,000 psi and a length between 5 mm to 18 mm.

9. The lightweight concrete according to claim 8, further comprising an amount of waterproof admixture effective to reduce both the water vapor and water permeability of the concrete.

10. The lightweight concrete according to claim 8, wherein the expanded lightweight aggregate is a combination of expanded polystyrene bead and expanded perlite, and a ratio of the expanded perlite relative to the expanded polystyrene bead can be varied to absorb water amount out of the wet concrete before the concrete set.

11. The lightweight concrete according to claim 8, wherein entrained air cells in the concrete can be partially substituted by any lightweight aggregate having a compression strength less than 2500 psi or expanded polystyrene bead having the same size as the entrained air cells.

12. The lightweight concrete according to claim 8, wherein the lightweight aggregate is one of expanded polystyrene bead or a combination of expanded polystyrene and expanded perlite.

* * * * *